INVENTOR
ROBERT E. ADAMS

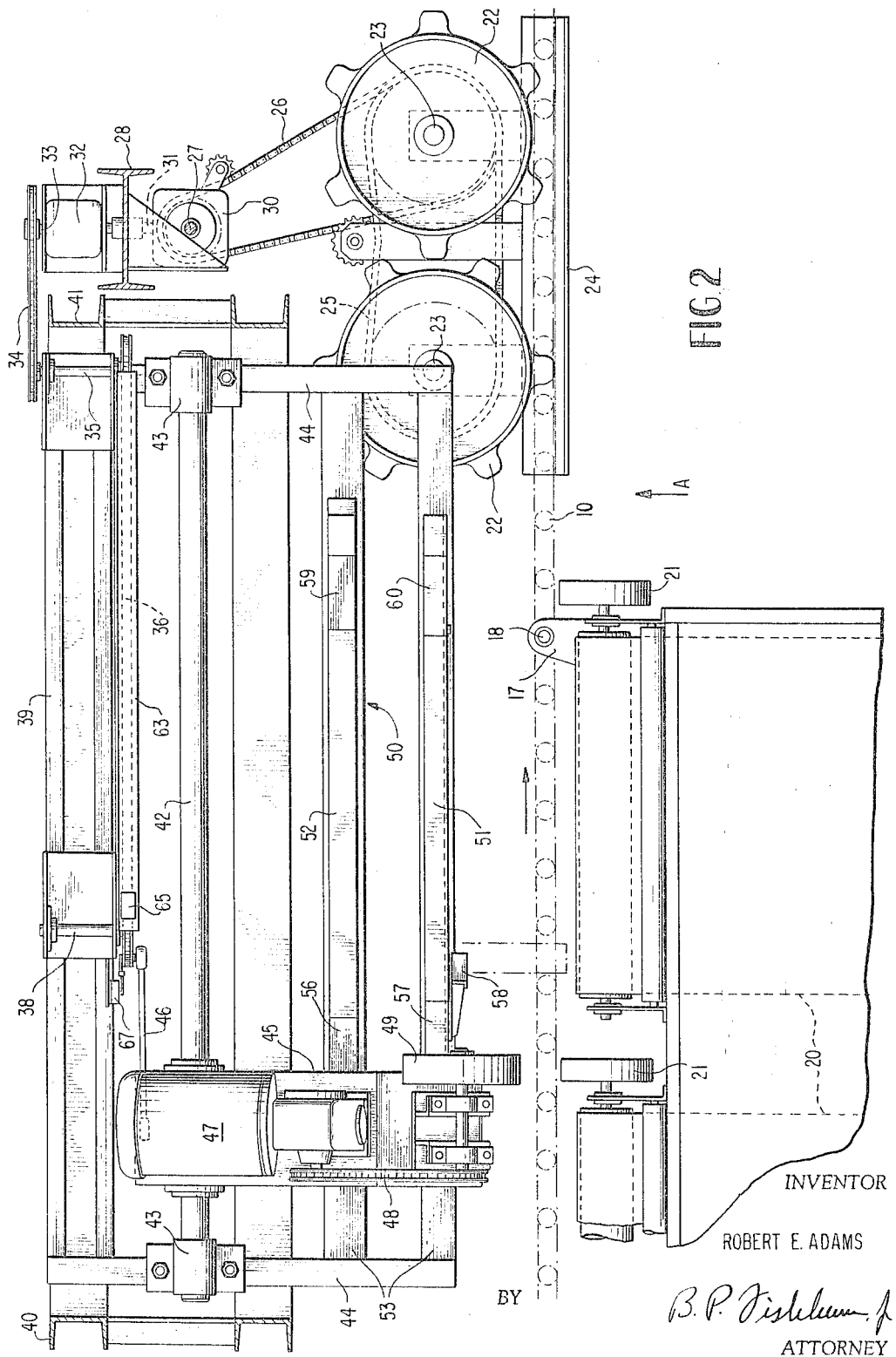

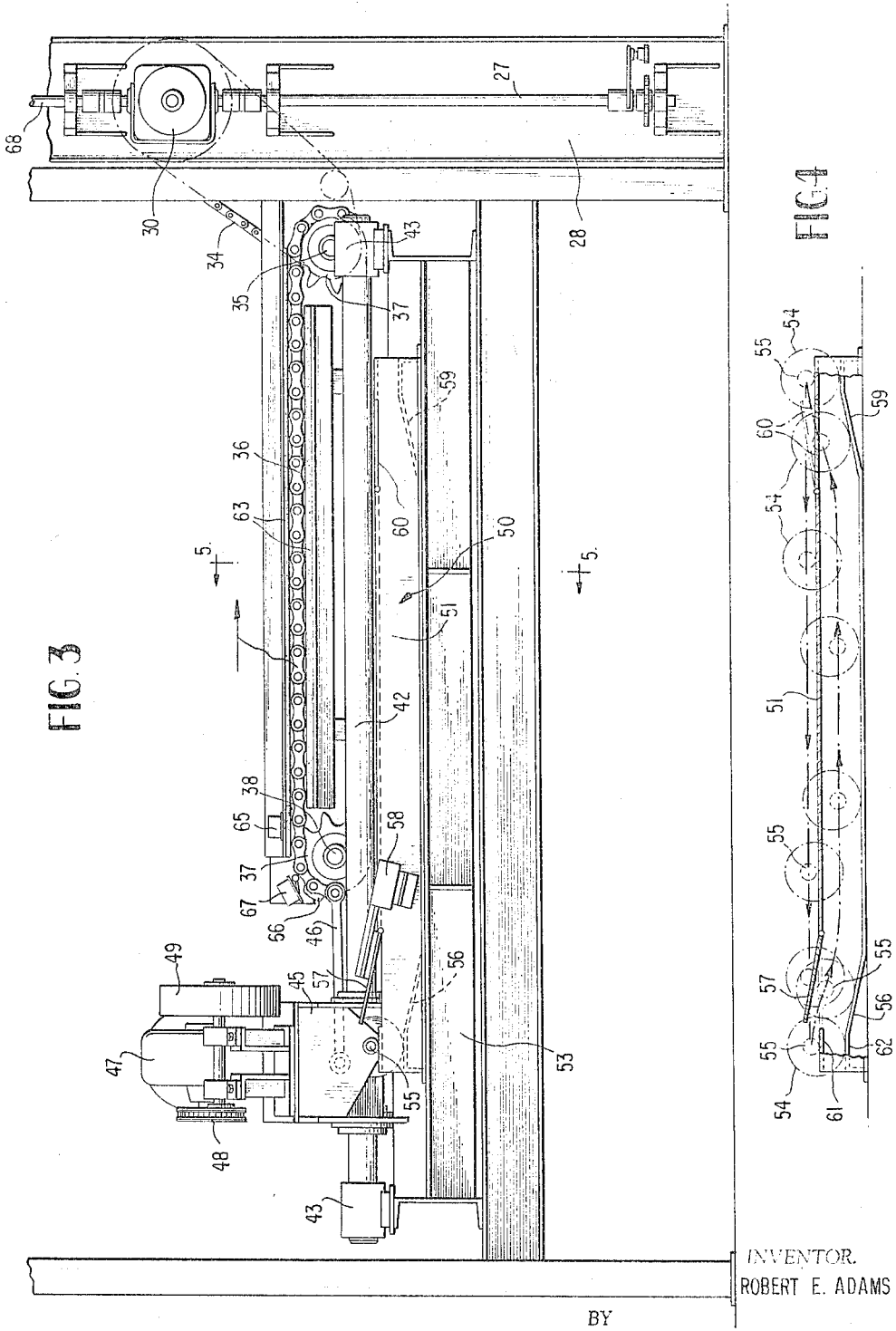

BY

ATTORNEY

United States Patent Office 3,291,286
Patented Dec. 13, 1966

3,291,286
CONVEYOR UNLOADING APPARATUS
Robert E. Adams, Hudson, N.Y., assignor to Gifford-Wood, Inc., Newton, Mass., a corporation of Massachusetts
Filed Oct. 19, 1965, Ser. No. 497,838
10 Claims. (Cl. 198—185)

The present invention relates to conveyor unloading apparatus.

More particularly, the invention relates to means for automatically discharging or unloading articles from continuously moving storage receptacles or trucks while the latter are propelled over a designated course by a main conveyor chain.

An objective of the invention is to provide article unloading apparatus which is capable at selected stations along the main conveyor system of automatically moving into operating enagagement with an adjacent storage truck, traveling along with the storage truck and its propelling chain for a given distance sufficient to allow automatic unloading of the truck and then automatically disengaging the truck and retracting to an initial ready position, all of such action being initiated automatically by the approach and presence of the truck on the main conveyor system.

Another object of the invention is to provide conveyor unloading apparatus of the mentioned character which is versatile in its construction so that units of the apparatus may be set up for unloading at any selected elevation or level on a given truck or at plural levels, each truck having a plurality of superposed article supporting conveyor means for cooperation with the unloading apparatus.

Another object is to provide apparatus of the mentioned character which is extremely rugged and durable, reliable and efficient in operation, and reasonably economical.

Other objects and advantages of the invention will be apparent during the course of the following detailed description.

In the accompanying drawings forming a part of this application and in which like numerals are employed to designate like parts throughout the same, FIGURE 1 is a transverse cross sectional view through the main conveyor track and chain, showing a unit of the unloader apparatus in end elevation with one article conveying and storage truck adjacent thereto, partly broken away;

FIGURE 2 is a fragmentary horizontal cross section taken substantially on line 2—2 of FIGURE 1;

FIGURE 3 is an interior side elevation of the unloader apparatus, partly broken away, looking in the direction of the arrow A, FIGURE 2;

FIGURE 4 is a partly diagrammatic longitudinal sectional view of a cam track forming a part of the unloader apparatus;

Figure 1:
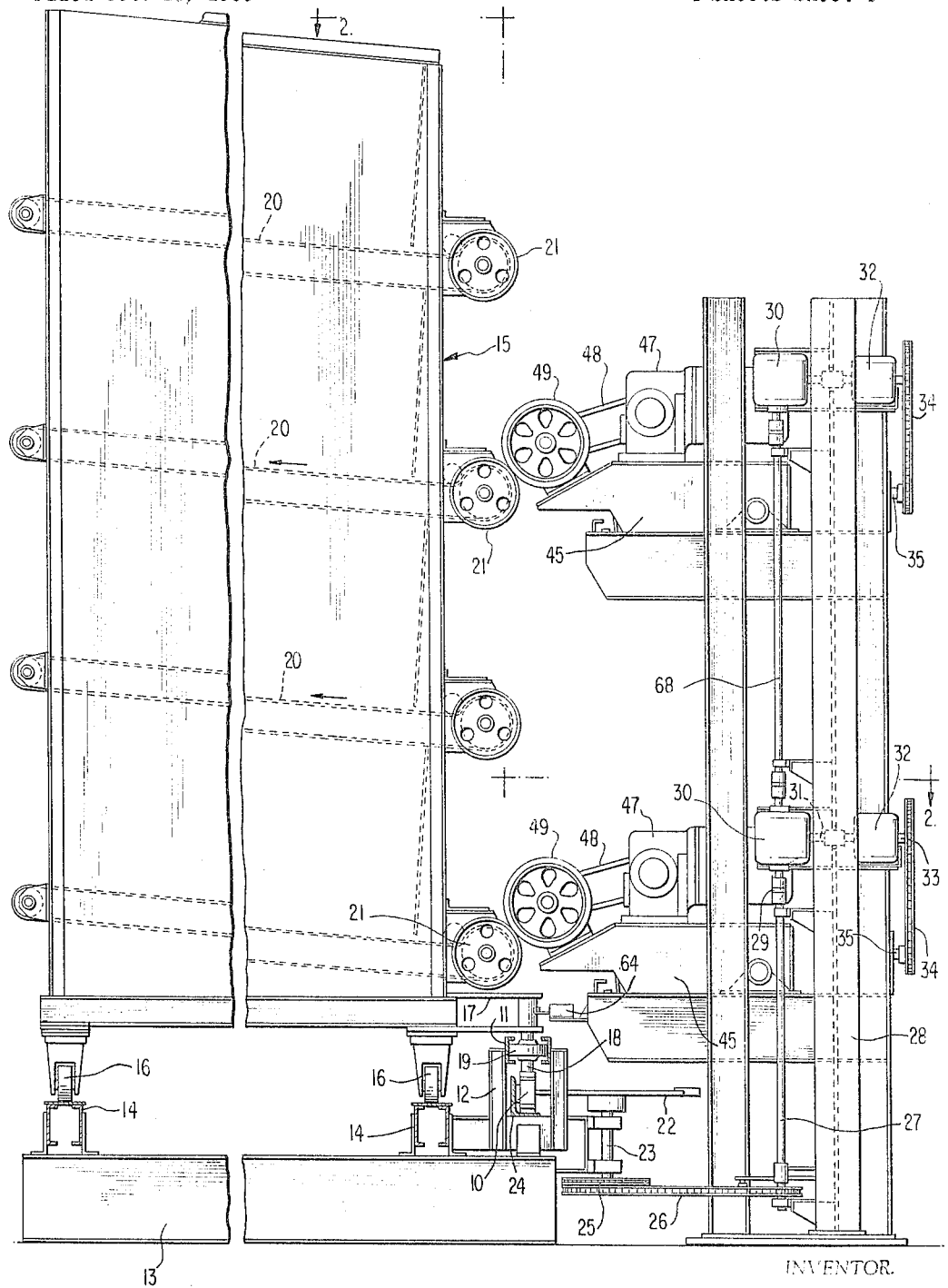

In the drawings, wherein for the purpose of illustration is shown a preferred embodiment of the invention, the numeral 10 designate a main endless horizontal drive chain forming a part of a main conveyor system which may be of any desired length or configuration depending upon requirements. Typically, in a commercial package-handling depot, the endless main conveyor chain may constitute a horizontal loop of 600 or 700 feet in length. The chain 10 is conventionally powered in any preferred manner, such as by a plurality of spaced caterpillar-type drive units or sprocket gear power units or the like. The chain 10 is continuously driven in the direction of the arrow in FIGURE 2. The chain 10 is supported close to floor level throughout its entire length by a somewhat elevated channel track 11, FIGURE 1, from which the chain proper is suspended and by which it is guided. This construction is substantially conventional.

The chain track 11 and associated elements is supported at intervals by bracket structure 12, rigidly mounted upon track supports 13, upon which are mounted the tracks 14 for conveying and storage receptacles or trucks 15, only one of which is shown in the drawings. It will be understood that the entire system employs a multiplicity of the trucks 15 and that only one such truck is illustrated in the drawing in association with one unloading station or one unit of the unloading apparatus which constitutes the essence of the invention. At spaced intervals along the main chain 10, any desired number of unloading stations may be provided, as will be further discussed.

The truck 15 is a very large bin-like receptacle as shown having wheels 16 which roll upon the tracks 14. The truck is connected to the main conveyor chain 10 near its bottom by means of an arm 17 and pin connection 18 with the underlying chain 10, see FIGURES 1 and 2. The truck 15 is guided by a roller 19 in engagement with the elevated track 11, as shown in FIGURE 1. By this arrangement, the truck 15 moves continuously along with the main conveyor chain 10.

The truck 15 embodies a plurality of vertically spaced slightly inclined endless belt platforms or supports 20 adapted to support articles, such as commercial packages of various sorts. The belts 20 are adapted to be driven for unloading the articles from the truck 15 by friction drive wheels 21 journaled upon one side of the truck 15 and operatively connected with the belts 20. Articles are loaded onto the belts at loading stations along the system, or at a single station, and the articles may be classified by placing them on different ones of the belts 20 at different elevations. The overall article handling system is very flexible in this sense and the precise manner of utilizing it may be varied. The present invention is concerned solely with the mechanism at an unloading station for cooperating with the continuously moving conveyor trucks 15 to automatically unload them in the desired manner and without disturbing certain selected belts 20 whose contents are not to be unloaded at the particular station.

With reference to the particular unloading station apparatus shown in the drawings, power is taken off continuously from the main chain 10 by a pair of large sprocket gears 22 whose teeth are in constant mesh with the moving chain, as shown. These sprocket gears 22 are carried by vertical shafts 23, journaled within bearings on the adjacent support structure 12 which includes a horizontal bar section 24 for that portion of the chain 10 which is in mesh with the two sprocket gears, so as to stabilize the chain. The vertical shafts 23 of the sprocket gears 22 are preferably adjustable so as to assure that one tooth of one of the sprocket gears is always in engagement with the chain. This assures a continuous and smooth operation of the unloading carriage and associated drive means, to be described, and also assures synchronism of the drive means.

The two power take-off sprocket gears 22 are drivingly interconnected by a horizontal endless chain 25 and cooperating sprocket gears on the lower ends of shafts 23. Another horizontal endless chain 26 is powered from the lower end of the outer shaft 23, FIGURE 2, and continuously turns a vertical counter-shaft 27 journaled in suitable bearings mounted on an adjacent column or tower 28. The upper end portion of countershaft 27 is coupled as at 29 to the input shaft of a right-angle and through gear unit 30 of conventional construction, also securely mounted upon the tower structure at a considerable elevation above the lower end thereof. The gear unit 30 has a horizontal output shaft 31 projecting from its rear side, coupled to a conventional electrically-controlled clutch and brake unit 32, also mounted upon the adjacent tower structure. The arrangement is such that the counter-shaft 27 and the shaft 31 into the clutch and gear unit 32 rotate continuously while the main chain 10 is moving. However, the output shaft 33 of the clutch and gear unit is driven only when the automatic brake is released and the automatic clutch is rendered active by control switch means, to be described.

The output shaft 33 of the clutch and gear unit 32 drives an endless chain 34, the lower end of which is operatively connected with the power shaft 35 of an endless horizontal carriage drive chain 36 which extends parallel to and longitudinally of the main conveyor chain 10 at an elevation above the same. The carriage drive chain 36 is under control of the clutch and brake unit 32 and is started and stopped as dictated by this unit in conjunction with certain limit switches, to be described.

The chain 36 engages end sprocket gears 37, FIGURE 3, carried by shafts 38 and 35. These shafts are suitably supported on a framework 39 forming a part of the adjacent tower structure including uprights 40 and 41, FIGURE 2.

A straight horizontal carriage guide bar 42 is firmly supported at its ends in bearings 43 which rest upon sturdy beams 44 forming a part of the fixed framework. Slidably mounted on the guide bar 42 is an unloader carriage 45 which is adapted to travel or reciprocate back-and-forth along the guide bar. This carriage is permanently linked to the endless chain 36 by a rigid connecting link 46 whose ends have a ball-type swivel connection with both the chain 36 and the carriage 45 to prevent binding and to assure proper alignment in all positions of the carriage. Through this link 46 the carriage 45 is caused to move back-and-forth on the guide bar 42 while the chain 36 moves in the direction of the arrow in FIGURE 3.

Bodily mounted upon the carriage 45 is a conventional gear motor unit 47 including an output chain drive 48 which is adapted to positively drive a rubber-treaded friction drive wheel 49 when the unit 47 is in operation. The friction drive wheel 49 is adapted under certain conditions to engage and frictionally drive one of the unloader wheels 21 of truck 15 during an automatic cycle of operation. The friction drive wheel 49 moves bodily with the carriage 45 upon the guide bar 42.

Figure 6:
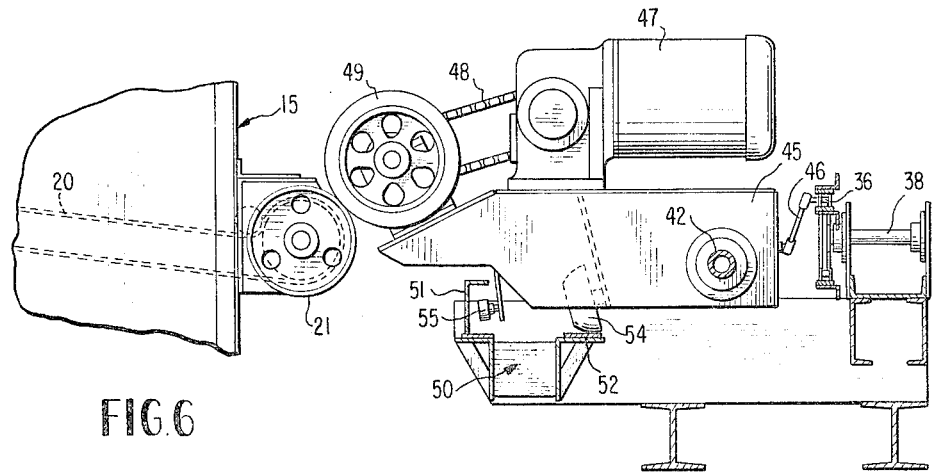
FIGURE 6 is a similar view showing the drive carriage lowered and active.
Figure 5:
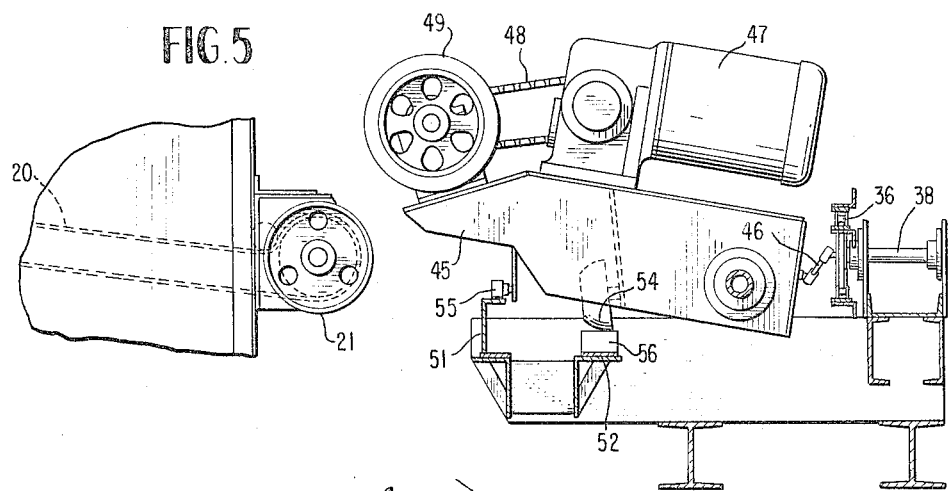
FIGURE 5 is a transverse vertical section taken on line 5—5 of FIGURE 3 and showing the drive carriage of the unloader apparatus retracted and elevated.

As best shown in FIGURES 2, 5 and 6, a dual cam track 50 including cam track sections 51 and 52 extends parallel to the main chain 10 and guide bar 42 and is supported rigidly on longitudinal beams 53 which constitute a part of the fixed frame structure. This cam track arrangement is also shown somewhat diagrammatically in FIGURE 4. A large depending follower roller 54 on the carriage 45 engages the inner track section 52 while a smaller follower roller 55, also on the carriage 45, and spaced laterally of the roller 54 engages the track section 51. The purpose of these two rollers and the cam track arrangement is to regulate the vertical swinging of the carriage 45 or the pivoting of this carriage on the longitudinal axis of the bar 42 so as to bring the friction drive wheel 49 into driving engagement with the wheel 21 at the proper time and to also control the disengagement of the two wheels.

More specifically, when the chain 36 and link 46 begin to pull the carriage 45 to the right or in the direction of the arrow, FIGURE 3, from the starting position shown in FIGURES 2 and 3, the large roller 54 will begin to descend the inclined track ramp 56 of the interior track 52. The outer track 51 has a vertically swingable gate portion 57 at its leading end which is biased open by a counterweight 58. This arrangement allows the small follower roller 55 to descend with the roller 54 and the remainder of the carriage so that wheel 49 will swing downwardly and engage the adjacent wheel 21 of the truck 15, as shown in FIGURE 6, while the carriage 45 is moving in the same direction as the truck and at the same speed as the truck and main chain 10.

At the remote end of the cam track 50, after the carriage 45 has completed its unloading traverse with the truck 15, the large roller 54 rolls up an inclined ramp portion 59 on the interior track 52 and this immediately elevates the carriage 45 and friction drive wheel 49 to the position indicated in FIGURE 5. At this end of the cam track, the outer track section 51 has a normally closed pivoted gate 60 which is now engaged from beneath and raised by the small roller 55, see FIGURE 4. This allows the small roller 55 to be positioned at the level of the outer track 51, after which the gate 60 falls automatically to the position shown in solid lines in FIGURE 4.

When the carriage 45 now begins its return travel toward the left in FIGURES 2 and 3, the smaller roller 55 will move along the outer track 51 and will hold the carriage and the larger roller 54 elevated, as indicated in FIGURE 4. The entrance gate 57 will swing down to permit the passage of the small roller 55 back thereover to the initial starting position where both rollers rest on short level track sections 61 and 62, FIGURE 4. The counterweight 58 now automatically elevates the gate 57 to prepare for the next traverse of the carriage and wheel 49 with the next oncoming truck of the conveyor system.

Figure 7:
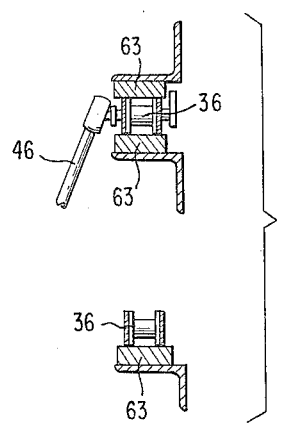
FIGURE 7 is an enlarged fragmentary transverse cross section through the carriage chain drive and associated linkage.

As shown particularly in FIGURE 7, the endless chain 36 has both its upper and lower runs continuously supported and guided by strips 63 in the interest of accuracy and smoothness of operation.

To initiate the cycle of operation of the carriage 45 and associated elements, a first limit switch 64 is suitably mounted upon the stationary framework of the unloading station, see FIGURE 1, with the actuator of the switch in the path of movement of the truck connector arm 17. Consequently, the approach of the truck 15 at the unloading apparatus or station operates the switch 64 to release the brake of the clutch and brake unit 32 and to engage the clutch of the conventional electrically-controlled unit. This release of the brake in effect releases the chain 36 for movement and the engagement of the clutch transmits power from the continuously moving shafts 27 and 31 to the output shaft 33, chain 34 and the carriage drive chain 36. As a result of this, the carriage 45 instantly commences its cycle of operation previously described and the timing is such that the friction drive wheel 49 is aligned with one of the wheels 21 of the truck 15. As previously explained, the carriage 45 moves in unison with the truck and the chain 10 and at the same speed as the truck. Consequently, the action of the cam track 50 above-described causes automatic engagement of the wheels 49 and 21 at the beginning of the traverse and automatic disengagement of these wheels at the end of the carriage traverse.

As the chain 36 begins to accelerate the carriage 45 to the right from its initial position in FIGURES 2 and 3, this chain operates a second limit switch 65 in the path of travel thereof which activates the gear motor unit 47, thus powering the friction drive wheel 49 during the movement of the carriage. The gear motor 47 continues to be powered, as does the chain 36, during the forward and reverse travel of the carriage 45 on the guide bar 42, as described in connection with the cam track 50. When the carriage 45 reaches the end of its return travel, a suitable projection 66 on the chain 36 operates a third limit switch 67 which immediately engages the brake of unit 32 and disengages the clutch thereof, thus stopping the carriage 45 at the original position and allowing the shaft 31 to turn freely without driving the shaft 33. The same limit switch 67 at the same time de-activates the gear motor 47, stopping the wheel 49. This completes the automatic cycle of operation of the apparatus.

It will of course be understood that the particular belt 20 connected with the particular wheel 21 engaged and driven by the wheel 49 will unload its articles or packages while the friction wheels are thus engaged and while the forward traversing of the carriage 45 is taking place. The other wheels 21 of the truck 15 which are not engaged will not be effected and no unloading from the other belts 20 will occur.

In this connection, FIGURE 1 shows a stacked arrangement of carriages 45 on the tower structure with a second friction drive wheel 49 near the top to engage and operate another of the wheels 21 and belts 20 of the truck. The upper carriage 45 has a duplicate drive identical in construction and operation to the lower carriage and this upper drive is operated through a continuously turning extension 68 of counter-shaft 27 above the gear unit 30. If preferred or depending upon requirements, the upper carriage 45 may be omitted entirely and only the lower carriage and drive need be employed or viceversa in some instances. In this connection, the apparatus is extremely flexible and the friction wheels 49 of the unloading stations may be arranged to engage one or more of the truck wheels 21 at substantially any desired elevation so that selective unloading in a desired pattern can be accomplished at various stations along the system. The station illustrated in FIGURE 1 is simply a typical illustrative example and the invention is not limited to this arrangement. However, the essential mechanism of the invention as described, other than the arrangement of the carriage on the tower structure, will be the same in all cases.

Any preferred number of trucks 15 may be connected with the main chain 10 and any desirable number of unloading stations may be installed along the system with the carriages 45 and wheels 49 located in the most desirable manner at each such station. A given station may have only a carriage 45 in the lowest position as for operating the lowermost wheel 21 of the truck 15. At another station, the wheel 49 may be at the uppermost point on the tower structure to operate only the uppermost wheel 21. It is believed that the various capabilities of the unloading apparatus and the utility thereof will now be completely understood by those skilled in the art, without the necessity for further description of the apparatus. The apparatus is characterized by its simplicity, relatively few parts, and ruggedness. It is very efficient and reliable in operation and requires a minimum of maintenance.

It is to be understood that the form of the invention herewith shown and described is to be taken as a preferred example of the same, and that various changes in the shape, size and arrangement of parts may be resorted to, without departing from the spirit of the invention or scope of the subjoined claims.

What is claimed is:

1. Conveyor unloading apparatus comprising in combination a main continuously moving conveyor element, an article storage truck connected with and moving with the main conveyor element, power take-off gearing engaging the main conveyor element and continuously driven thereby, a continuously rotating element driven by said power take-off gearing, a clutch and brake unit connected with said continuously rotating element, additional gearing connected with the clutch and brake unit and held against movement when said brake is active and released and driven when the clutch is active and the brake is inactive, a fixed guide member extending longitudinally of the main conveyor element and spaced therefrom and paralleling the path of movement of said truck, a carriage pivotally and slidably mounted upon said guide member, means interconnecting said carriage and last-named gearing so that powering of the last-named gearing causes reciprocation of the carriage on the guide member, cam means near and spaced from the guide member and connected with the carriage to cause vertical swinging of the carriage on the guide member during movement thereof along the guide member, a friction drive element on the carriage and power means on the carriage to operate the friction drive element, a cooperating friction drive element on said truck to cause unloading of the truck while engaged with the friction drive element of the carriage, said vertical swinging of the carriage causing engagement and disengagement of said friction drive elements, and control means on said apparatus in the path of movement of said truck and last-named gearing and operable upon approach of the truck to initiate reciprocation of the carriage and to halt the carriage at the end of its reciprocation on said fixed guide member.

2. The invention as defined by claim 1, and wherein said control means includes a first limit switch in the path of movement of the truck and controlling the operation of said clutch and brake unit.

3. An apparatus for unloading articles selectively from endless belt supports of mobile carriers traveling with a continuously moving conveyor element, each belt support having a friction drive wheel connected therewith on said truck, said apparatus comprising a fixed supporting framework, a countershaft journaled on said framework, power take-off gearing interconnecting the counter-shaft and said conveyor element to continuously turn the counter-shaft, a carriage mounted for reciprocation on the framework in the direction of movement of the truck and also mounted for vertical movement relative to the framework and truck, intermittently operable gearing interconnecting the carriage and counter-shaft to reciprocate the carriage while the truck is adjacent the framework, power means on said carriage including a friction drive wheel to engage the first-named friction drive wheel when the carriage is in a lowered position and moving in the same direction as the truck and at the speed of the truck, cam track means on said supporting framework engaging the carriage to cause lowering and raising thereof during reciprocation of the carriage to effect proper engagement and disengagement of said friction drive wheels, and control means on said apparatus in the path of movement of the truck and said intermittently operable gearing to cause said intermittent operation to start and stop in a prescribed cycle and to cause starting and stopping of said carriage power means.

4. The invention as defined by claim 3, and wherein said intermittently operable gearing includes an electrically controlled clutch and brake unit having an input shaft and an output shaft, gearing connected with the driven by the output shaft including an endless chain for propelling said carriage, and a link interconnecting said carriage and chain and having swiveled connections therewith, whereby movement of the chain in one direction will effect reciprocation of the carriage.

5. The invention as defined by claim 3, and wherein said cam track means comprises parallel cam track sections each having level central portions, one track section having inclined end portions, the other track section having pivoted gate end portions one of which is normally elevated and the other of which is normally level, and a pair of follower rollers on said carriage one each adapted to engage one of said track sections, one of said rollers adapted to pass under the normally elevated gate end portion when the carriage is moving in one direction to allow descending of the carriage and to subsequently elevate the remote gate end portion when the carriage is moving upwardly responsive to the other roller traveling on one of the inclined end portions.

6. A conveyor unloading appaartus comprising a continuously moving horizontal conveyor chain, a truck connected with said conveyor chain and propelled thereby, friction drive article supports on the truck adapted when driven to automatically unload the truck, power take-off means connected with and driven by said chain and including a vertical continuously rotating counter-shaft, intermittently operated gearing connected with said counter-shaft including a clutch and brake unit, a carriage mounted for horizontal reciprocation and vertical swinging movement near one side of said truck and having a connection with the intermitently operated gearing so that the carriage reciprocates when the clutch of said unit is active and the brake is inactive and the carriage is held against reciprocation when the brake is active and the clutch is inactive, friction drive means on the carriage adapted to engage a selected one of said friction drive article supports, cam means connected with the carriage to cause vertical swinging thereof near opposite ends of its linear movement, and limit switch control means for said clutch and brake unit and friction drive means on the carriage.

7. The invention as defined by claim 6, and wherein said limit switch control means includes a first limit switch in the path of movement of the truck to release the brake and activate the clutch of said unit, a second limit switch in the path of movement of said intermitently operated gearing to activate the friction drive means on the carriage, and a third limit switch in the path of movement of the intermittently operated gearing to activate the brake and de-activate the clutch of said unit and to also interrupt the operation of the friction drive means on the carriage.

8. The invention as defined by claim 6, and wherein the carriage mounting comprises a supporting framework, a horizontal cylindrical guide bar on the framework parallel to the path of movement of the truck and forming a pivotal support for the carriage as well as a longitudinal guide so that the carriage can travel in unison with the truck and said conveyor chain.

9. The invention as defined by claim 6, and wherein said power take-off means includes a pair of toothed wheels each meshing with the horizontal conveyor chain, gearing interconnecting said toothed wheels, and additional gearing interconnecting the last-named gearing and said counter-shaft.

10. The invention as defined by claim 6, and wherein the friction drive means on the carriage comprises a gear motor unit, a friction drive wheel journaled upon the carriage in spaced relation to the gear motor unit and having its axis of rotation parallel to the path of movement of said truck and conveyor chain, and gearing interconnecting the gear motor unit and friction drive wheel.

References Cited by the Examiner

UNITED STATES PATENTS 3,231,068  1/1966  Harrison _____ 198—181

MARVIN A. CHAMPION, *Primary Examiner.*

R. E. AEGERTER, *Assistant Examiner.*